United States Patent [19]

Gagliano

[11] Patent Number: 5,171,193
[45] Date of Patent: Dec. 15, 1992

[54] REDUCTION GEAR WITH HIGH REDUCTION RATIO

[75] Inventor: Vitaliano Gagliano, Passignano sul Trasimeno, Italy

[73] Assignee: A.T. Avanzata Tecnologia S.r.l., Passignano sul Trasimeno, Italy

[21] Appl. No.: 659,292

[22] PCT Filed: Apr. 3, 1991

[86] PCT No.: PCT/IT89/00064
§ 371 Date: May 20, 1991
§ 102(e) Date: May 20, 1991

[87] PCT Pub. No.: WO90/04117
PCT Pub. Date: Apr. 19, 1990

[30] Foreign Application Priority Data

Oct. 7, 1988 [IT] Italy ................ 22240 A/88

[51] Int. Cl.⁵ .............................. F16H 1/30
[52] U.S. Cl. .................................. 475/333
[58] Field of Search ................. 475/304, 333

[56] References Cited

U.S. PATENT DOCUMENTS

| | | | |
|---|---|---|---|
| Re. 17,704 | 6/1930 | Sifton | 475/304 |
| 1,594,987 | 8/1926 | Adams | 475/333 X |
| 2,208,614 | 7/1940 | Watson | 475/333 X |
| 2,505,434 | 4/1950 | Schmidt | 475/333 X |
| 3,552,225 | 1/1971 | Van Voorhis | 74/425 |
| 4,697,476 | 10/1987 | Maxwell | 475/333 |

FOREIGN PATENT DOCUMENTS 887835 1/1962 United Kingdom .
1180431 2/1970 United Kingdom .

*Primary Examiner*—Dirk Wright
*Attorney, Agent, or Firm*—Wegner, Cantor, Mueller & Player

[57] ABSTRACT

The object of the invention is a reduction gear comprising a worm screw driving shaft (3) engaging with a first portion (6a) shaped so as to obtain a gear wheel mating the driving means (3), at least one worm screw shaped second portion (6b), connected to said at least one first portion (6a) engaging with a rack (13b, 15b) integral with a gear wheel, which acts as a power take-off (30, 31). The gear-wheel shaped first portion (6a) and the worm screw shaped second portion (6b) can be provided on the body of a pinion or spool (6).

1 Claim, 3 Drawing Sheets

FIG. 1
FIG. 2
FIG. 3
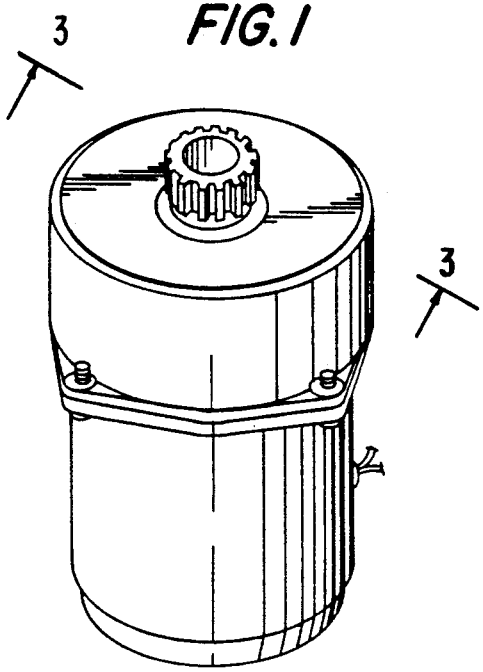
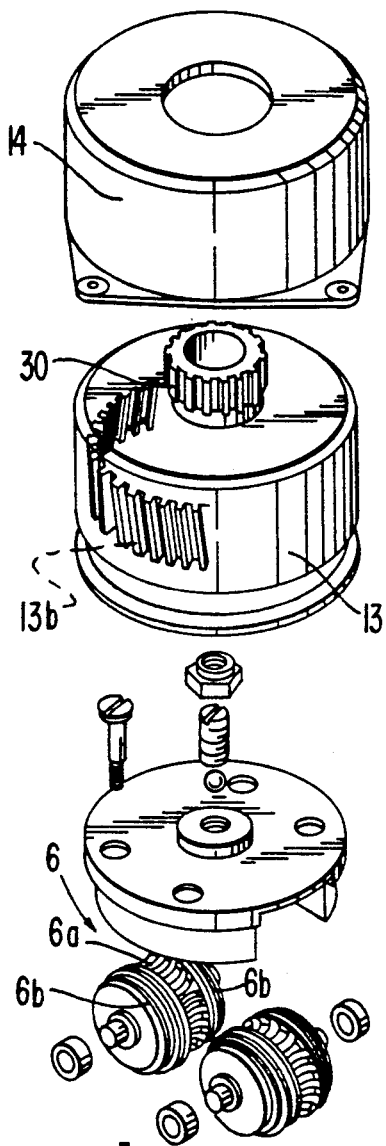
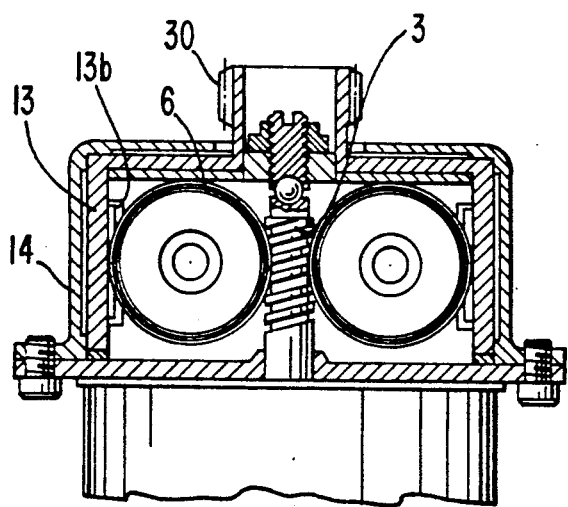
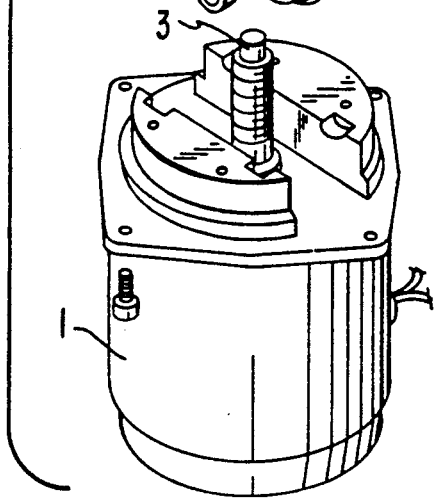

REDUCTION GEAR WITH HIGH REDUCTION RATIO

The present invention relates to a mechanical reduction gear.

Mechanisms are known which, when inserted between a driving shaft and a driven shaft, reduce the speed of the second with respect to that of the first at a fixed ratio (reduction ratio).

Reduction gears already known generally consist of gears wheels with different diameters. In reduction gears, usually the high speed elements, that is the first drive elements are subjected to low stress, while the low-speed elements, that is the last drive elements, are subjected to high stress. In known reduction gears, in order to avoid the said high stress being borne by one gear only, the number of gears is increased, with a consequent increase in the dimension of the reduction gear. All the return forces are released on the first transmission element only, for example a worm screw.

U.S. Pat. No. 4,697,476 discloses a reduction worm gear comprising an input worm shaft meshing with two diametrically opposite planetary worm gears which have a central gear meshing with the input worm and two lateral globoid worms engaging with a split ring, internal, double enveloping gear.

A reduction gear as described could not be assembled in practice and does not allow therefore a useful teaching in the field.

The aim of the invention is to produce a reduction gear, with a sturdy structure which will allow high reduction ratios.

The above aim has been achieved by providing a reduction gear as claimed in claim 1. The reduction gear comprises a driving means, preferably a worm screw driving shaft engaging with at least a first portion, shaped so as to provide a gear wheel mating to the driving means, at least one worm screw shaped second portion, connected to said at least first portion, engaging with a rack integral with a gear wheel, which acts as a power take-off.

The first portion and the second portion can be connected by means of a clutch plate.

Preferably the gear wheel shaped first portion mating with the driving means, suitable for engaging with the driving means, and the worm screw shaped second portion, suitable for engaging with the rack, are provided on the body of a spool or pinion. A spool may also be provided with a gear wheel shaped central portion and two worm screw shaped side portions.

The worm screw shaped side portions of the spool are tapered at the ends, having a spindle-shaped form, whose larger base is adjacent to the central portion.

Preferably the rack is provided on the inner surface of an element, which surrounds the unit consisting of the driving means and at least one spool.

The element which surrounds the unit consisting of the driving means and at least one spool can be a cup-shaped element, with a rack-shaped cylindrical inner surface, while its closed base supports a small gear wheel acting as a power take-off.

In a different embodiment, the element surrounding the unit consisting of the driving means and said at least one spool is a ring, having an inner rack and an external gear wheel shape which acts as a peripheral power take-off.

A preferred embodiment of the reduction gear according to the invention foresees two spools, diametrically opposed with respect to the worm screw driving means, whose central portions engage with the driving means, while the two side portions of each spool engage with the rack.

In the embodiment with two spools, the reduction gear according to the invention allows high reduction ratios without excessive loading of the mechanical drive parts. The problem of extension of action and reaction forces from fast motion to slow motion is, in fact, solved by increasing the mechanical parts in the passage from fast to slow motion, without any considerable increase in the dimension of the structure. The passage is from a driving means, for example a worm screw shaft, to two joined toothed portions, and the transmission to the rack finally takes place through four worm screw shaped portions.

The particular structure of the reduction gear according to the invention has the additional advantage of not allowing inversed stress on the mechanical parts.

The invention will now be more clearly explained with the aid of the enclosed drawings, in which:

FIG. 1 shows a perspective view of a first reduction gear;

FIG. 2 shows an exploded perspective view of the reduction gear in FIG. 1;

FIG. 3 shows a section of the reduction unit in FIG. 1, along the line 3—3 in FIG. 1;

In the FIGS. from 1 to 3, a geared motor is shown comprising a motor 1 which transmits the motion to a worm screw driving shaft 3.

Figure 5:
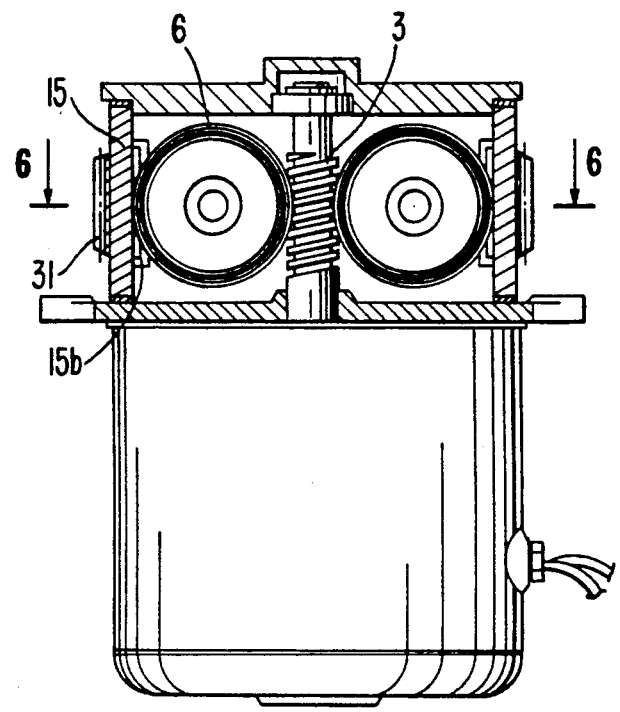
FIG. 5 shows a section of the reduction unit in FIG. 4, along the line 5—5 in FIG. 6.
Figure 4:
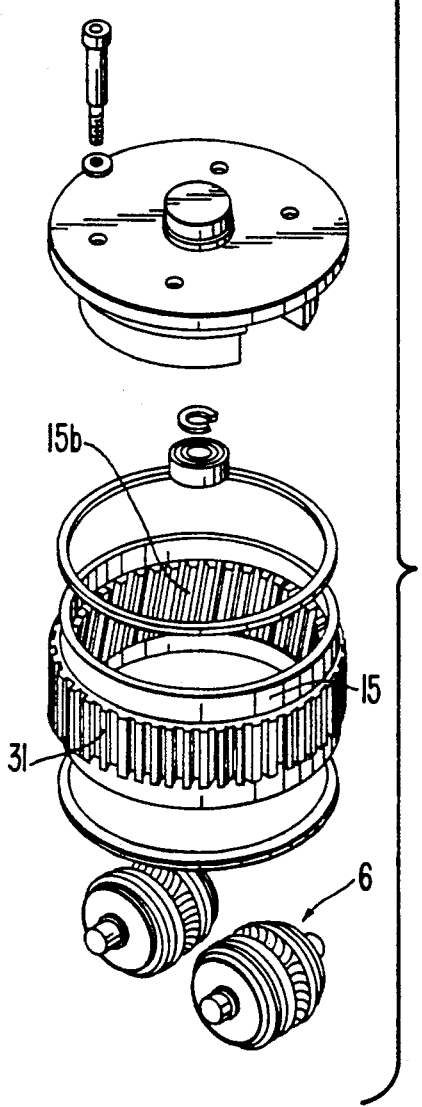
FIG. 4 shows an exploded perspective view of a second exemplary embodiment the reduction unit.
Figure 6:
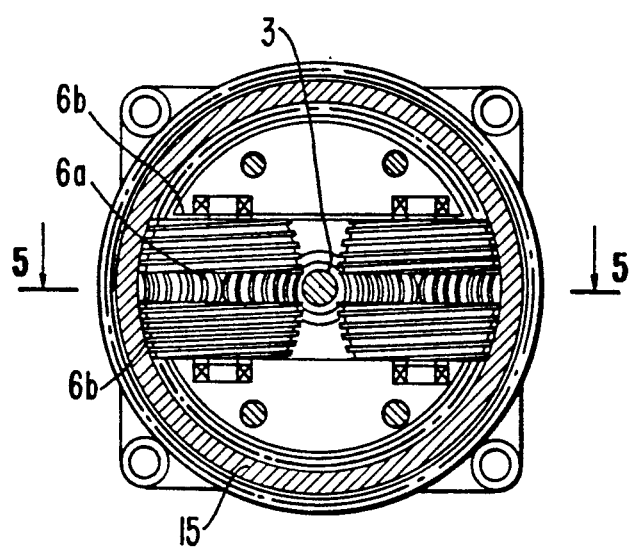
FIG. 6 shows a section along the line 6—6 in FIG. 5.
Figure 7:
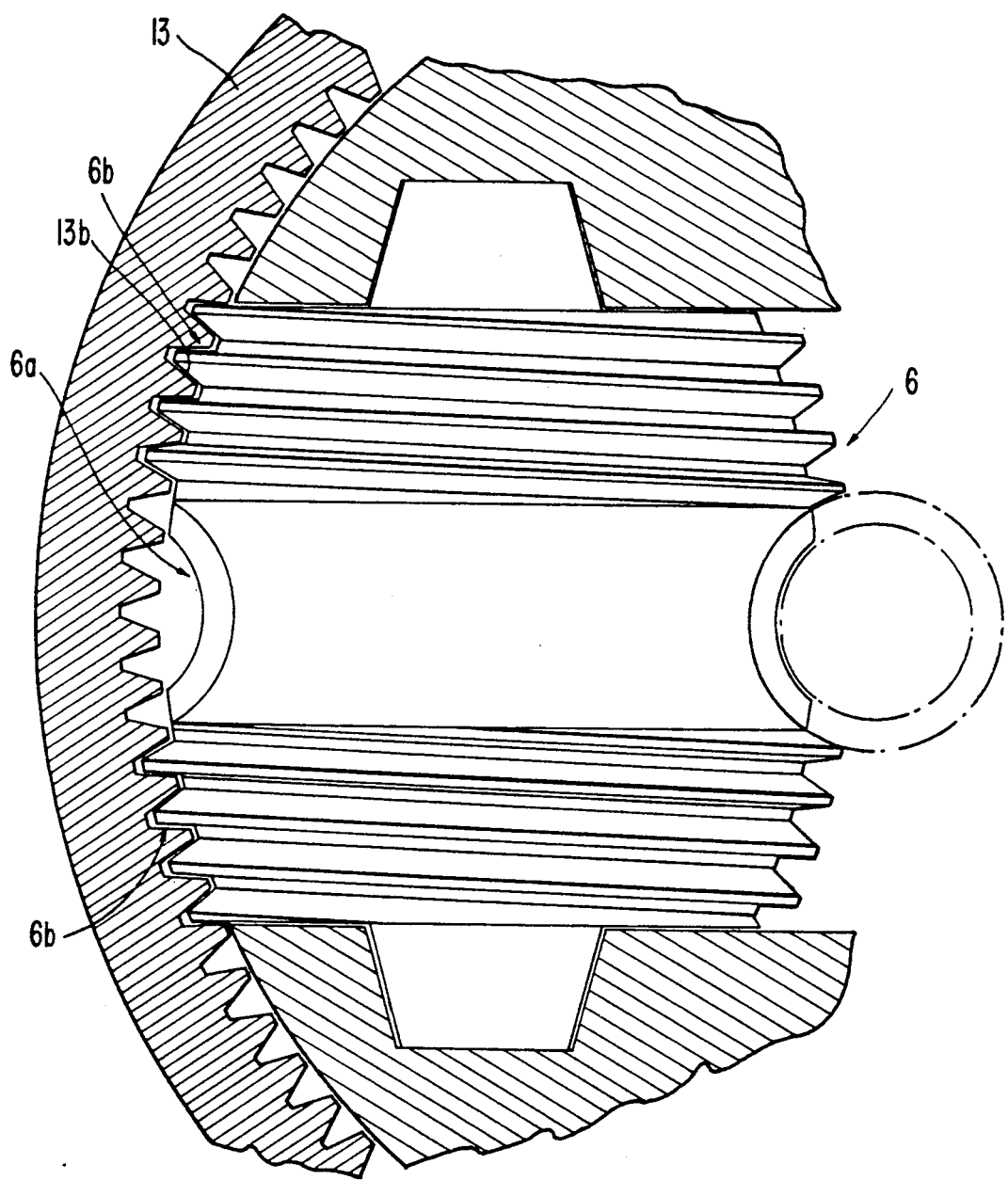
FIG. 7 shows the shaping of a spool.

The worm screw driving shaft 3 engages with central portions 6a, which are shaped so as to obtain gear wheels mating with the worm screw consisting of the shaft 3, of two spools or pinions 6 positioned diametrically opposed with respect to the said shaft 3. The spools 6, which are shown in greater detail in FIG. 7, have two worm screw shaped portions 6b, positioned laterally to the central portion 6a, which mesh with the cylindrical inner rack-shaped surface 13b of a cup element 13. As can be seen from the drawings, the lateral portions 6b of spools 6 are tapered toward the ends of the spool, allowing the mesh between the projections of the said portions 6b and the teeth of the rack 13b. The cup element 13 supports a gear wheel 30, which protrudes from a crankcase 14 and acts as a power take-off.

As is clearly seen, in the reduction gear described the rotation transmitted to the driving shaft 3 is transmitted to the counter-rotating spools 6, which, meshing with the rack 13b, rotate the cup element 13 and in consequence the gear wheel 30.

In the reduction gear described, the mechanical transmission or drive parts increase in the passage from fast motion to slow motion: the passage is from a worm screw shaft 3 to two joined portions 6a, and the transmission to the rack 15b finally takes place through four worm screw shaped portions 6b. From the point of view of the load, this solves the problem of the extension of the forces of action and of reaction, from fast motion to slow motion.

In the FIGS. from 4 to 6 a second example of a reduction gear is shown, which differs from the one previously described, substantially in that the rack 13b is provided on the inner surface of a ring element 15, on the outer surface of which a toothed shaping 31 is provided, which acts as a power take-off.

I claim:

1. A reduction gear comprising:
   a worm screw driving means (3);
   at least a barrel shaped pinion (6), a first portion (6a) of which is shaped so as to provide a gear wheel mating with the driving means (3), one worm screw shaped second portion (6b), connected to said first portion (6a) engaging with an internally toothed (13b, 15b) gear wheel (13), which acts as a power take-off (30, 31) characterized in that the internally toothed gear wheel (13) has a cylindrical inner rack-shaped surface (13b),
   the worm screw shaped second portion (6b) of the pinion (6) is tapered towards the end of the pinion, allowing the mesh between said portion (6b) and the teeth of the rack;
   said first gear wheel shaped portion (6a) and said second worm screw shaped portion (6b), are portions of a same pinion or spool (6);
   said cylindrical surface surrounds the unit consisting of the driving means (3) and said at least one pinion (6);
   said surface (13b, 15b) is part of a ring (15) having an external gear wheel shaping (31), which acts as a peripheral power take-off.

* * * * *